Feb. 6, 1962     J. P. BOGATER ETAL     3,019,934
LIFT GATE SUPPORT FOR STATION WAGON
Original Filed Sept. 23, 1954     6 Sheets-Sheet 1
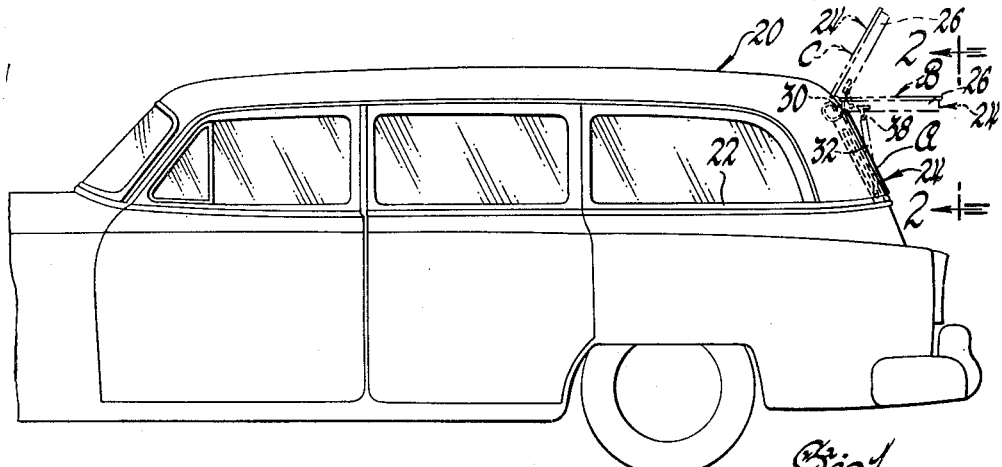
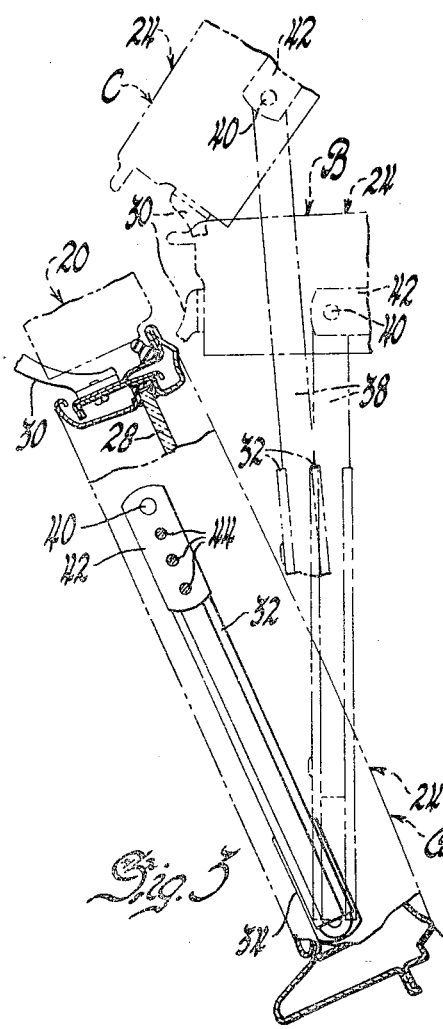
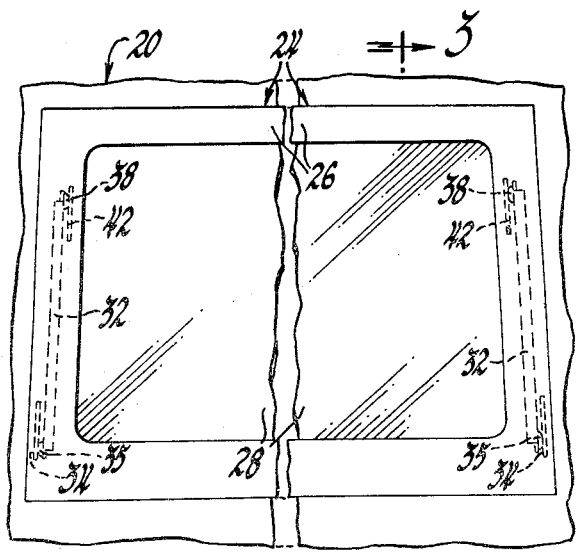
Inventors
John P. Bogater,
Samuel F. Loria, &
Nelson E. Putnam
BY
W. S. Pettigrew
ATTORNEY Feb. 6, 1962     J. P. BOGATER ETAL     3,019,934
LIFT GATE SUPPORT FOR STATION WAGON
Original Filed Sept. 23, 1954     6 Sheets-Sheet 2
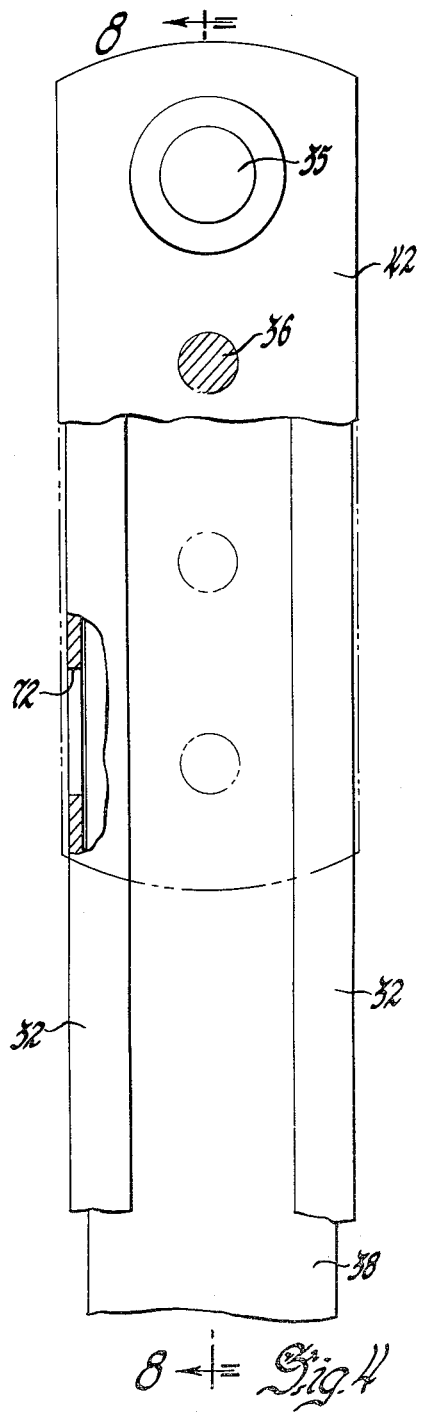
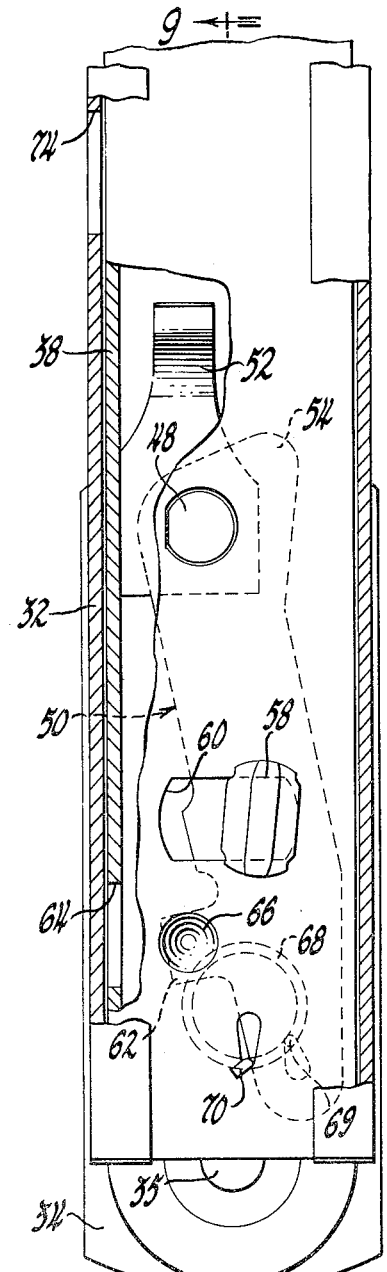
Inventors
John P. Bogater,
Samuel F. Loria, &
by Nelson E. Putnam
W. S. Pettigrew
ATTORNEY

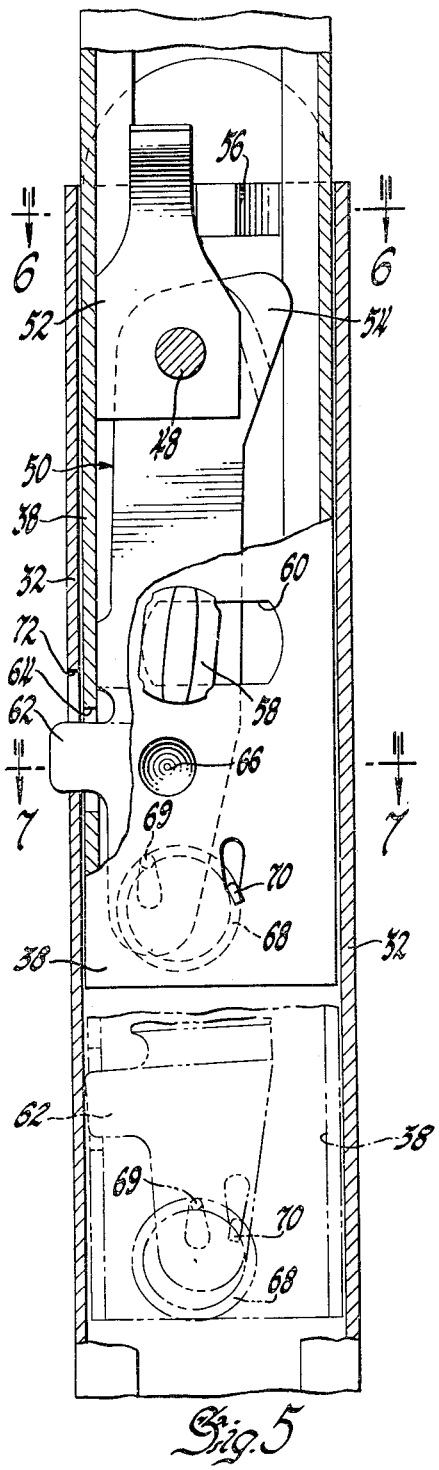
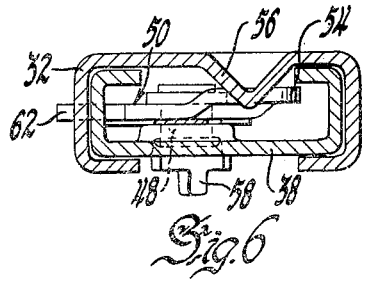
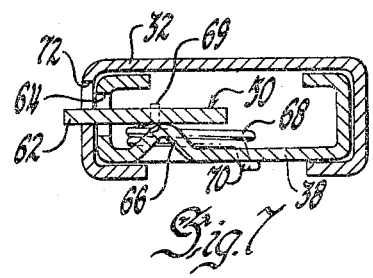

Inventors
John P. Bogater,
Samuel F. Loria, &
Nelson E. Putnam
BY W. S. Pettigrew
ATTORNEY

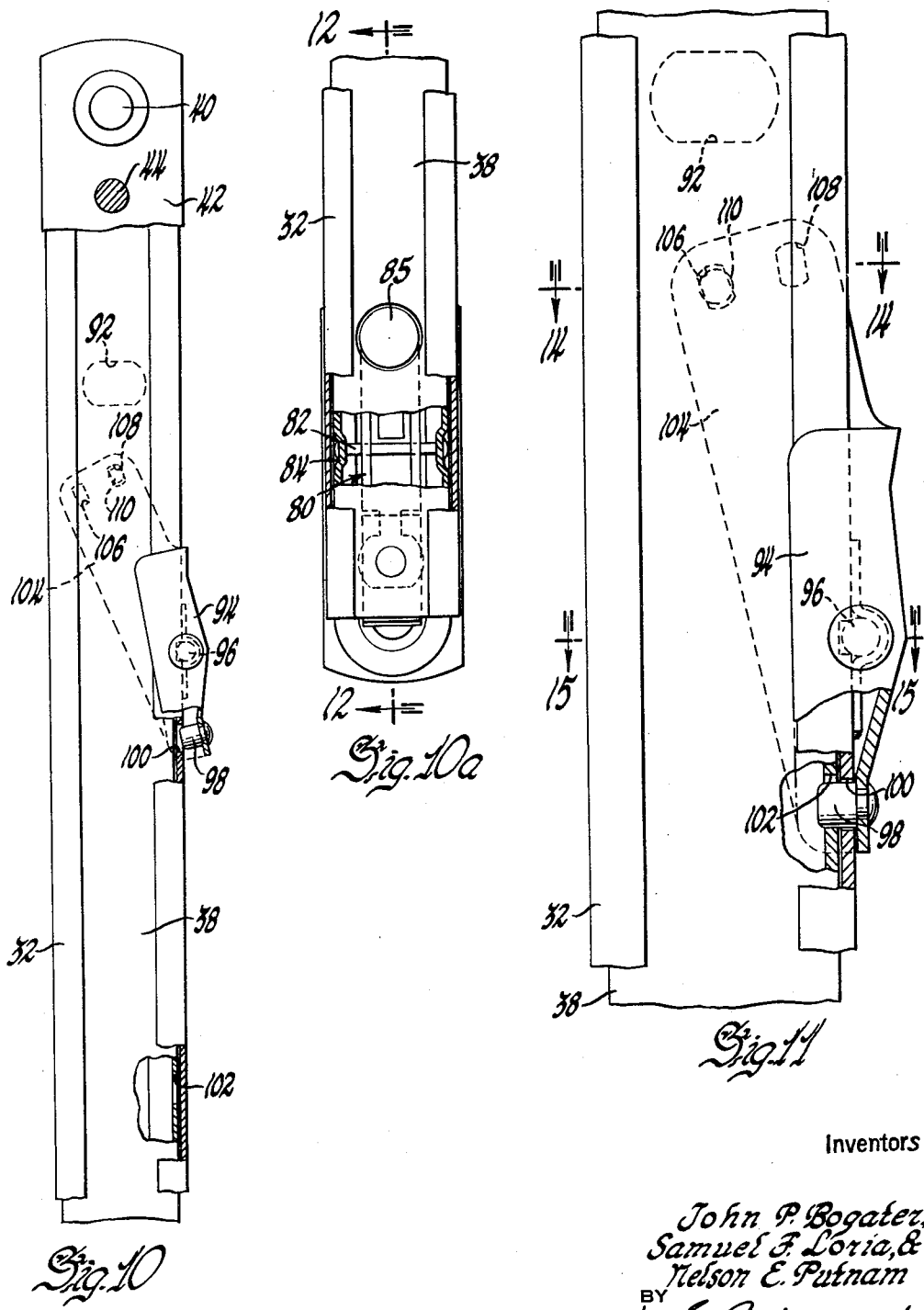

Feb. 6, 1962 J. P. BOGATER ETAL 3,019,934
LIFT GATE SUPPORT FOR STATION WAGON
Original Filed Sept. 23, 1954 6 Sheets-Sheet 6
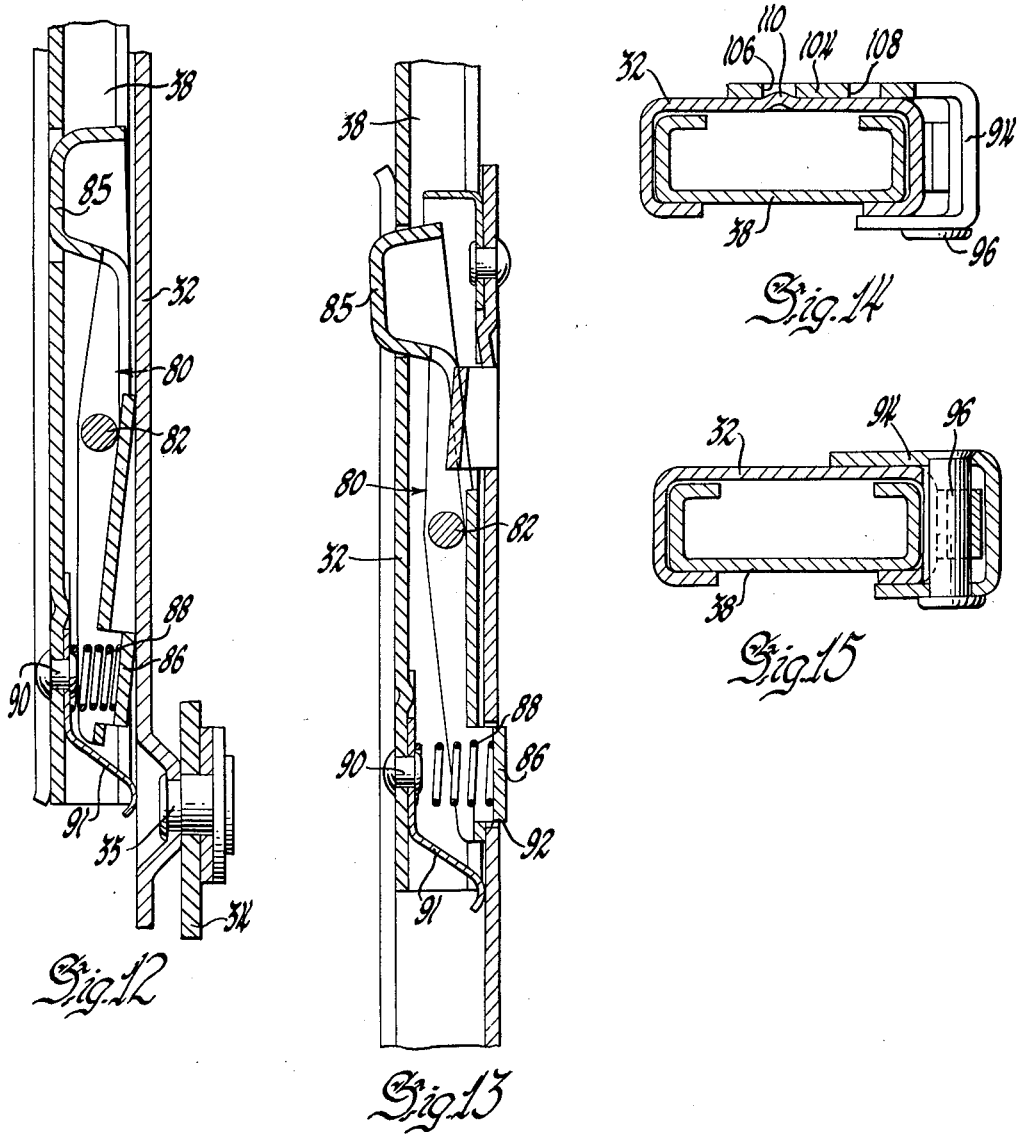
Inventors
John P. Bogater,
Samuel F. Loria, &
Nelson E. Putnam
BY W. S. Pettigrew
ATTORNEY

3,019,934
LIFT GATE SUPPORT FOR STATION WAGON

John P. Bogater, Detroit, and Samuel F. Loria and Nelson E. Putnam, Livonia, Mich., assignors to General Motors Corporation, Detroit, Mich., a corporation of Delaware Original application Sept. 23, 1954, Ser. No. 457,872, now Patent No. 2,908,415, dated Oct. 13, 1959. Divided and this application Feb. 2, 1959, Ser. No. 790,752

3 Claims. (Cl. 217—60)

This invention relates to a support for a hinged closure, and more particularly to a lift gate support for a station wagon.

This application is a division of our copending application Serial No. 457,872, filed September 23, 1954, now Patent No. 2,908,415, granted October 13, 1959.

One feature of the invention is that it provides an improved lift gate support for a station wagon; another feature of the invention is that it provides a pair of telescopic support channels with improved latch means on said channels for supporting the lift gate or other closure in a selected one of a plurality of different positions; a further feature of the invention is that it provides means for supporting a lift gate in a fully open position above the horizontal or in an intermediate position in which the lift gate is generally horizontal; still another feature of the invention is that it provides selectively operable means for presetting the latch means to pass by one of said positions; yet a further feature of the invention is that it provides means for overriding the selectively operable means to insure engagement of the latch to support the closure at another position; yet another feature of the invention is that, in one form, it provides a first latch for supporting the lift gate in fully open position and a second latch for supporting the lift gate in an intermediate position, and selective operable means for presetting the second latch to pass by said intermediate position; and still another feature of the invention is that, in another form, it provides a single latch with selectively operable means for presetting this latch to pass by the intermediate position.

Other features and advantages of the invention will be apparent from the following description and from the drawings, in which:

FIG. 1 is a fragmentary side elevation of a station wagon including the improved lift gate support;

FIG. 2 is a fragmentary rear view of the station wagon taken along the line of 2—2 of FIG. 1 and showing part of the lift gate, the center portion thereof being broken away;

FIG. 3 is an enlarged detail view showing the various positions of the support when the lift gate is in closed position, in intermediate position and in fully open position;

FIG. 4 is a further enlarged fragmentary view of the upper portion of one of the pairs of telescopic channels, a part being shown in section to show the latch keeper slot;

FIG. 4a is a fragmentary view of the lower portion of the telescopic channels, showing the latch means, a portion of the channels being shown in section;

FIG. 5 is a fragmentary view, partly in section, of the telescoping channels and latch means, the latch being shown in two different positions;

FIG. 6 is a transverse section through the channels, being taken along the line 6—6 of FIG. 5;

FIG. 7 is a transverse section through the channels, being taken along the line 7—7 of FIG. 5;

FIG. 9 is a longitudinal section through the lower portion of the channels, being taken along the line 9—9 of FIG. 4a;

FIG. 10 is an elevation, partly in section, of the upper portion of the telescopic channels, showing a modified form of the invention;

FIG. 10a is similar to FIG. 9, but shows the lower portion of the channels;

FIG. 11 is an enlarged view, partly in section, of a portion of the structure shown in FIG. 10;

FIG. 12 is a section through the lower portion of the channels taken along the line 12—12 of FIG. 10a;

FIG. 13 is a section similar to FIG. 12, but showing the parts in a different position;

FIG. 14 is a transverse section through the channels taken along the line 14—14 of FIG. 11; and FIG. 15 is a transverse section through the channels taken along the line 15—15 of FIG. 11.

Figure 8:
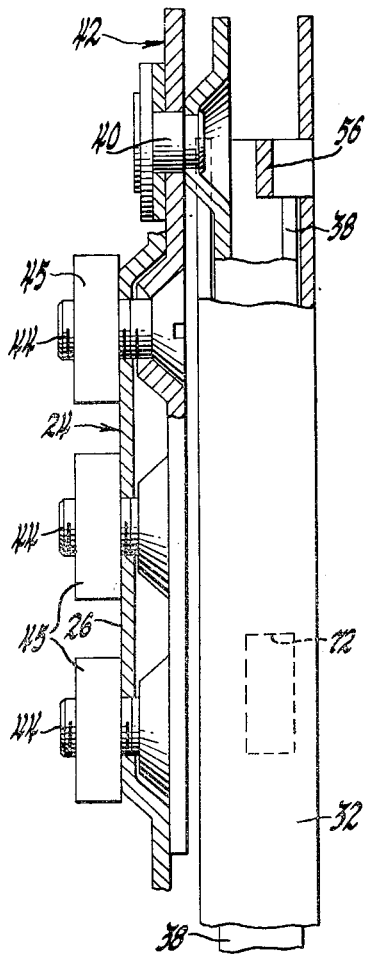
FIG. 8 is a longitudinal section through the upper portion of the channels, being taken along the line 8—8 of FIG. 4.
Figure 9:
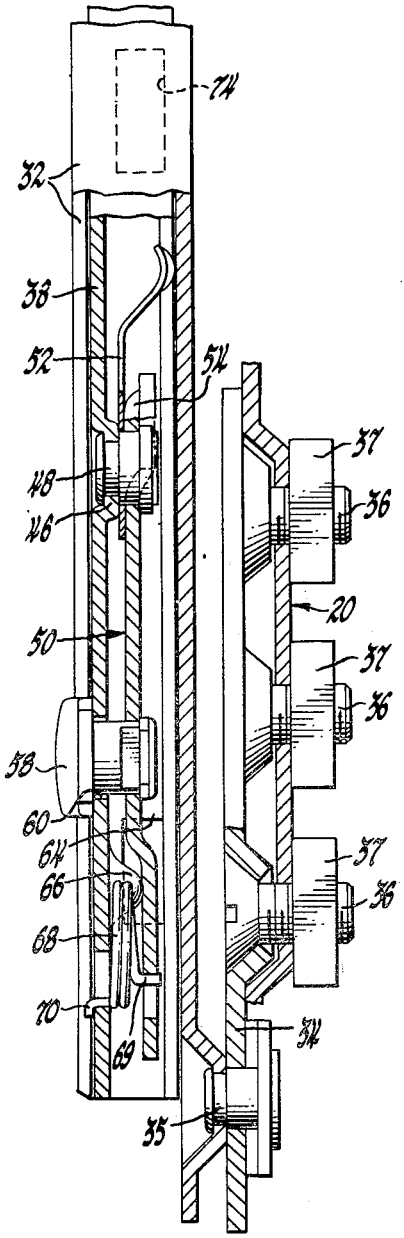

Referring now to the drawings, and more particularly to FIGS. 1–9, 20 is a station wagon body having in its rear side above the belt line 22 a lift gate 24. The lift gate comprises a peripheral frame 26 extending across the rear of the station wagon body and mounting a window 28, as shown in FIGURE 2, and the lift gate is pivotally mounted at its upper edge for swinging movement about a horizontal axis on hinges 30.

As shown in FIGURES 1 and 3, the lift gate 24 is movable between a closed position A, an intermediate generally horizontal position B, and a fully open position C wherein the lift gate extends above the horizontal. Since in a modern station wagon the hinge axis of the lift gate is only about five feet from the ground, it is preferred to hold the lift gate in a position well above the horizontal, as shown at C in FIGURES 1 and 3, when the lift gate is fully open to facilitate the removal of articles from the rear end of the station wagon body. However, it is often desirable to travel with the lift gate open either to increase the flow of air through the body of the vehicle in warm weather or to enable carrying long loads which extend beyond the rear end of the station wagon. When the lift gate is in the fully open position C, it is not well adapted for traveling, particularly at high speeds, and, therefore, it is advantageous to latch the lift gate at a substantially horizontal intermediate position B.

This invention provides novel and improved means for latching or holding the lift gate at a fully open position C or at a generally horizontal intermediate position B, with the added feature of means for presetting the latch means to pass by the intermediate position B when desired. This is advantageous particularly when the lift gate is opened while the operator is carrying packages or other articles in his arms, since the latch may be preset and the lift gate may be fully opened without again operating the latch at the intermediate position B.

As shown in the drawings, at each side of the station wagon body there is a pair of telescoping support channels. Since these channels and the latch means associated therewith are identical at opposite sides of the car the structure at one side only will be described in detail.

There is an outer channel 32 which is pivoted at its lower end at 35 to an outer channel support bracket 34 mounted by means of bolts 36 and nuts 37 (FIGURE 9) to the station wagon body 20. An inner channel 38 is telescopically slidable within the outer channel 32, the top end of the inner channel being pivoted at 40 to a support bracket 42 secured by bolts 44 and nuts 45 (FIGURE 8) to the frame 26 of the lift gate. This arrangement of telescoping channels is old and well known in the art.

In order to releasably lock the channels 32 and 38 together to support the lift gate in its various positions, latch means are mounted within the channels. Near its lower end the inner channel 38 has a recessed portion 46 (see FIG. 9) and a rivet 48 is secured in this recess and provides a pivotal mounting for a latch member designated generally as 50. An anti-rattle spring 52 is mounted on the rivet 48 and bears against the wall of the inner channel.

Adjacent its pivotal mounting the latch member 50 is provided with a foot 54 for cooperation with a stop lug 56 (which is bent from channel 32) to kick the latch to operated position, as will be hereinafter described, and adjacent its longitudinal center the latch 50 has an operating knob 58 which projects out through a slot 60 in the channel 38. This knob may be grasped by the operator to move the latch member pivotally from an operated position as shown in FIGURE 5 in the center portion thereof to an operative position shown in broken lines in the lower portion in FIGURE 5 or to an inoperative position as shown in FIGURE 4a. The latch 50 has a latch lug 62 adapted to project through a slot 64 in the inner channel 38 into a selected one of a plurality of keeper slots in the outer channel member 32. Opposite the lug 62 the wall of the inner channel is detented as shown at 66 to provide a bearing for the latch member 50. At its lower free end the latch member 50 is connected to one end 69 of an over-center spiral spring 68, the other end 70 of the spring being anchored in an opening in the wall of channel 38.

The parts are so arranged that the end 69 of the spring (which is connected to the latch member) is on the same side of the anchored end 70 whether the latch be in its operated (latched) position or in its operative position shown in FIGURE 5. Consequently, the spring urges the latch from its operative position toward its operated position. However, if the latch 50 is pivoted to its inoperative position as shown in FIGURE 4a the end 69 of the spring passes to the other side of the anchored end 70, thus giving an over-center action so that the latch is now urged away from its operated position.

In the outer channel member 32 there is a first keeper slot 72 so located that it is opposite the latch lug 62 when the lift gate is in its fully open position shown at C in FIGURES 1 and 3. A second keeper slot 74 in the outer channel 32 is so located that it is opposite the latch lug 62 when the lift gate is in its generally horizontal intermediate position B shown in FIGURES 1 and 3. If desired a third keeper slot may be provided for holding the lift in its closed position A, or a separate latch device (not shown) may be used for this purpose.

Assuming the lift gate is closed and it is desired to open it to its fully open position C without stopping at its intermediate position B, the handle or operating knob 58 is grasped and moved to the right from the position shown in FIGURE 5 to the position shown in FIGURE 4a so that the latch is swung to its inoperative position and is yieldedly held in this position by the over-center spring 68. Now when the lift gate is opened it will pass by the intermediate or second keeper slot 74. When the lift gate reaches its fully open position the foot 54 at the top of the latch member 50 will abut the stop lug 56, kicking the latch over to its operated position wherein the lug 62 enters the keeper slot 72 to hold the lift gate in fully open position. It will be understood that the parts are similar on both sides of the car and that there is a latch at each opposite side.

If it is desired to lower the lift gate to closed position without stopping at the intermediate position B the knob 58 again is moved to the right to swing the latch to its inoperative position and the lift gate may be closed, bypassing the intermediate position B. When the lift gate is closed it may be latched by a keeper slot similar to the slot 72, 74 or (as is generally the case) by a separate latch provided with a key.

If it is desired to open the lift gate from closed position to the intermediate position B, then the handle is moved to the right only enough to retract the lug 62 from the keeper slot. The relation of the parts in this operative position is shown at the bottom of FIGURE 5 where it will be seen that the nose of the latch lug 62 rides on the inner surface of the outer channel member 32. With the parts in this position, the over-center spring constantly urges the latch toward its operated position so that when the intermediate keeper slot 74 moves opposite the latch lug, the latch lug 62 enters the keeper slot to hold the lift gate in its intermediate position. The lift gate may be moved to either fully open or closed position from its intermediate position by moving the knob 58 to retract the lug 62 from the keeper slot 74. In moving from intermediate position it makes no difference whether the latch is moved to its operative position or its inoperative position.

A modified form of the invention is shown in FIGURES 10–15. In this embodiment there is a first latch for supporting the closure in fully open position, a second latch for supporting the closure in intermediate position, and selectively operable means for presetting the second latch to pass by the intermediate position. In this embodiment of the invention the telescoping channels 32, 38 and the mounting means therefor may be similar to that described in connection with the embodiment of the invention shown in FIGURES 1–9, and this portion of the structure will not be described again.

The first latch means for holding the parts in fully open position is shown in FIGURES 10a, 12 and 13. The latch means comprises a latch member 80 pivotally mounted on a pin 82 journaled between recessed portions 84 in the walls of the inner channel 38. At its upper end latch 80 is formed with an operating button 85 and at its lower end the latch is formed with a lug 86 which is constantly urged toward an operated or latched position by a compression coil spring 88 mounted on a rivet 90 in the wall of the inner channel 38. An anti-rattle spring 91 also is mounted on rivet 90.

The outer channel is provided with a keeper slot 92 which is so located that it is opposite the latch lug 86 when the lift gate is in the fully open position C shown in FIGURES 1 and 3. When the lift gate has been raised to open position, the lug 86 enters the slot as shown in FIGURE 13 to hold the lift gate in its open position. When it is desired to lower the lift gate the operating button 85 is pressed to pivot the latch lug 86 out of engagement with the keeper slot 92 so that the lift gate may be lowered.

A second latch for supporting the lift gate in intermediate position is shown in FIGURES 10, 11, 14 and 15. This latch comprises a member 94 pivoted on a pin 96 on the outer channel member 32. The latch has at one end a projecting lug 98 located opposite a slot 100 in the outer channel and adapted to cooperate with a keeper slot 102 in the inner channel 38. The keeper slot is so located that it is opposite the latch lug 98 when the lift gate is in its intermediate position B shown in FIGURES 1 and 3.

The latch member 94 has an extending portion 104 which overlies the base wall of the outer channel 32 as shown best in FIGURE 14 and which is provided with a pair of slots 106 and 108. A detent 110 in the outer surface of the base wall of channel 32 engages slot 106 to frictionally hold the latch in its operated position as shown in FIGURE 11, or the detent may engage the slot 108 as shown in FIGURE 10 to frictionally hold the latch in its unlatched or operative position. Thus, before the lift gate is moved the latch may be preset to a position from which it is adapted to latch at intermediate position B or to bypass this intermediate position. When the parts are in the position shown in FIGURE 11, the latch has been preset to stop and latch at the intermediate position B. The latch may be moved, as by thumb pressure, into the slot 102. When the parts are in the position shown in FIGURE 10 the latch has been preset to bypass the intermediate position. When the latch has been preset to stop at the intermediate position, the proper intermediate latching location is found by feel when the lift gate has reached substantially a horizontal position.

While we have shown and described certain embodiments of our invention, it is capable of many modifications. Changes, therefore, in the construction and arrangement of parts may be made without departing from the spirit and scope of the invention as set forth in the appended claims.

We claim:

1. A support of the character described for a hinged closure, including: an outer channel; an inner channel slidably mounted in said outer channel in telescopic relation therewith; a first latch on one channel for supporting the closure in one position; a second latch on one channel for supporting the closure in another position; and means for presetting said second latch to pass by said other position.

2. A support of the character described for a hinged closure, including: an outer channel; an inner channel slidably mounted in said outer channel in telescopic relation therewith; a first latch and keeper on said channels for supporting the closure in fully open position; a second latch and keeper on said channels for supporting the closure in an intermediate position; and means for presetting said second latch to pass by said intermediate position.

3. A support of the character described for a hinged closure, including: an outer channel; an inner channel slidably mounted in said outer channel in telescopic relation therewith; a first latch and keeper on said channels for supporting the closure in fully open position, said first latch being mounted on said inner channel; a second latch and keeper on said channels for supporting the closure in an intermediate position, said second latch being pivotally mounted on said outer channel for manual movement between operative and inoperative positions; and means comprising friction detents for presetting said second latch in operative position in which it is adapted readily to be moved into engagement with the keeper at said intermediate position, or in inoperative position in which it passes by the keeper at said intermediate position.

References Cited in the file of this patent

UNITED STATES PATENTS

| | | |
|---|---|---|
| 1,353,523 | Eustege | Sept. 21, 1920 |
| 1,539,856 | Martin | June 2, 1925 |
| 2,288,925 | Simpson | July 7, 1942 |
| 2,549,133 | Scott | Apr. 17, 1951 |

FOREIGN PATENTS

| | | |
|---|---|---|
| 116,206 | Great Britain | June 6, 1918 |
| 350,902 | Germany | Mar. 28, 1922 |